(12) United States Patent
Beaupre (10) Patent No.: US 11,041,794 B2
(45) Date of Patent: Jun. 22, 2021

(54) RHEOLOGICAL PROBE

(71) Applicant: COMMAND ALKON INCORPORATED, Birmingham, AL (US)

(72) Inventor: Denis Beaupre, Sainte-Catherine-de-la-Jacques (CA)

(73) Assignee: Command Alkon Incorporated, Birmingham, AL (US)

(*) Notice: Subject to any disclaimer, the term of this patent is extended or adjusted under 35 U.S.C. 154(b) by 25 days.

(21) Appl. No.: 16/329,124

(22) PCT Filed: Aug. 30, 2017

(86) PCT No.: PCT/EP2017/071816
§ 371 (c)(1),
(2) Date: Feb. 27, 2019

(87) PCT Pub. No.: WO2018/041922
PCT Pub. Date: Mar. 8, 2018

(65) Prior Publication Data
US 2019/0242802 A1 Aug. 8, 2019

Related U.S. Application Data (60) Provisional application No. 62/381,721, filed on Aug. 31, 2016.

(51) Int. Cl.
*G01N 11/10* (2006.01)
*B28C 7/02* (2006.01)
*G01N 11/00* (2006.01)

(52) U.S. Cl.
CPC .............. *G01N 11/10* (2013.01); *B28C 7/024* (2013.01); *G01N 11/00* (2013.01); *G01N 2011/0046* (2013.01); *G01N 2011/0053* (2013.01)

(58) Field of Classification Search
CPC ... G01N 2011/0046; G01N 11/00; G01N 9/00
See application file for complete search history.

(56) References Cited

U.S. PATENT DOCUMENTS 3,147,612 A * 9/1964 Evans .................... G01N 11/10
73/54.39
3,631,712 A * 1/1972 Mercier ................. B28C 5/422
73/54.03
(Continued)

FOREIGN PATENT DOCUMENTS

DE 2552707 A1 * 5/1977
DE 2632076 A1 1/1978
(Continued)

OTHER PUBLICATIONS

Communication pursuant to Article 94(3) EPC, issued for European Application No. 17761852.7, dated Jan. 15, 2020, 6 pages.
(Continued)

*Primary Examiner* — David A. Rogers
(74) *Attorney, Agent, or Firm* — Norton Rose Fulbright US LLP (57) ABSTRACT

The rheological probe generally has a base; an inner member fixedly connected to the base and extending away from the base, the inner member having in succession a base portion proximate to the base, and a tip away from the base, and a deformable portion located between the base portion and the tip; a shell member covering the inner member, the shell member having a proximal portion being pivotally connected to the base for pivoting about a pivot axis when subjected to a resistance pressure imparted by a relative movement of the probe in a rheological substance, and a distal portion, the distal portion being engaged with the tip, the shell member having mating features being pivotally engaged with corresponding features of the base, the mating
(Continued)

features being located on transversally opposite sides of the proximal portion; and a deformation sensor mounted to the deformable portion.

20 Claims, 7 Drawing Sheets

(56) References Cited

U.S. PATENT DOCUMENTS

| | | | | |
|---|---|---|---|---|
| 3,640,121 | A * | 2/1972 | Mercier | G01N 33/26 |
| | | | | 73/54.03 |
| 3,688,588 | A * | 9/1972 | Hill | G01N 9/10 |
| | | | | 73/451 |
| 4,148,215 | A | 4/1979 | Hofstetter, Jr. | |
| 4,193,291 | A * | 3/1980 | Lynnworth | G01F 1/20 |
| | | | | 376/245 |
| 4,869,098 | A | 9/1989 | Haakana | |
| 5,086,646 | A * | 2/1992 | Jamison | G01N 9/00 |
| | | | | 73/65.01 |
| 5,131,265 | A * | 7/1992 | Tobin | B29C 45/7646 |
| | | | | 73/54.01 |
| 6,918,292 | B2 * | 7/2005 | Go Boncan | G01N 33/383 |
| | | | | 73/149 |
| 6,957,586 | B2 * | 10/2005 | Sprague | G01F 1/3209 |
| | | | | 73/204.21 |
| D638,729 | S * | 5/2011 | Beaupree | D10/78 |
| 9,199,391 | B2 * | 12/2015 | Beaupre | B28C 7/024 |
| 9,702,863 | B2 * | 7/2017 | Beaupre | B28C 5/422 |
| 10,052,794 | B2 * | 8/2018 | Beaupre | B28C 7/12 |
| 10,126,288 | B2 * | 11/2018 | Radjy | G01N 33/383 |
| 10,429,285 | B2 * | 10/2019 | Uusivirta | G01N 11/14 |
| 10,520,410 | B2 * | 12/2019 | Beaupre | G01N 11/10 |
| 10,527,534 | B2 * | 1/2020 | McAnally | G01H 13/00 |
| 2005/0087002 | A1 * | 4/2005 | Kanzaki | G01N 11/162 |
| | | | | 73/54.28 |
| 2007/0295104 | A1 | 12/2007 | Ellegood | |
| 2012/0204625 | A1 | 8/2012 | Beaupre et al. | |
| 2015/0355160 | A1 * | 12/2015 | Berman | G01N 11/14 |
| | | | | 73/54.03 |
| 2016/0025700 | A1 * | 1/2016 | Beaupre | B28C 7/02 |
| | | | | 73/433 |
| 2017/0108421 | A1 * | 4/2017 | Beaupre | G01N 11/10 |
| 2018/0100791 | A9 * | 4/2018 | Beaupre | G01N 11/14 |
| 2020/0018741 | A1 * | 1/2020 | Roberts | B28C 7/026 |

FOREIGN PATENT DOCUMENTS

| | | |
|---|---|---|
| EP | 0924040 A1 | 6/1999 |
| GB | 1060459 A | 3/1967 |
| WO | WO-2005029045 A1 * | 3/2005 ........... G01N 33/383 |
| WO | WO-2007060272 A3 * | 7/2007 ............... G08G 1/20 |

OTHER PUBLICATIONS

International Search Report and Written Opinion from PCT/EP2017/071816 dated Dec. 11, 2017, 10 pages.

* cited by examiner

RHEOLOGICAL PROBE

This application is a national phase application under 35 U.S.C. § 371 of International Application No. PCT/EP2017/071816 filed Aug. 30, 2017, which claims priority to U.S. Provisional Patent Application No. 62/381,721 filed Aug. 31, 2016. The entire contents of each of the above-referenced disclosures is specifically incorporated by reference herein without disclaimer.

FIELD

This disclosure relates to the field of rheological probes used to measure a rheological property of a substance in which they are displaced, and has specific applications in the field of ready-mix concrete production and handling.

BACKGROUND

Rheology includes the study of the flow of soft solids which exhibit fluid-like behaviors. Many applications can benefit from or even require the measurement of rheological properties of substances, particularly in cases where such properties change over time.

Ready-mix concrete is a good example. Between production and use, ready-mix concrete is typically continuously mixed in a mixer (typically a mixer truck) to prevent its premature solidification. However, even though mixing has a recognized effectiveness at maintaining the state of ready-mix concrete, it does have its limits. Some rheological properties of ready-mix concrete, such as viscosity and yield, can vary over time notwithstanding the mixing. Accordingly, ready-mix concrete can require monitoring and, eventually, adjustments (e.g. addition of water, addition of plasticizer) to maintain a satisfactory workability until end use.

Traditionally, a test referred to as the 'slump test' was traditionally used to monitor the ready-mix concrete. The slump test involves removing concrete from the mixer, placing it in a truncated cone of a given height, removing the cone, waiting for the concrete to settle, and measuring the distance the concrete had slumped down relative to the length of the truncated cone.

In more recent years, technological advancements have led to new methods and devices which have achieved many advantages over the traditional slump test. The rheological probe described in International Patent Publication WO 2011/042880 A1 is an example of such technological advancements. Although existing rheological probes were satisfactory to a certain degree, there remained room for improvement. In particular, it will be understood that durability, measurement precision, cost and manufacturability can represent significant considerations in the choice of a probe.

SUMMARY

In accordance with an aspect, there is provided a rheological probe having a base, an inner member fixed relative to the base, and a shell member covering the inner member. The shell member can have a proximal portion with mating features (e.g., rockers) pivotally mounted with corresponding mating features (e.g., recessed features) of the base to allow the shell member to pivot when the rheological probe is moved in a rheological substance. In some embodiments, the inner member has a longitudinal cavity along the inner member, and the shell member further includes a securing member extending within the inner member, having a first end secured to a distal portion of the shell member and a second end secured to the base to maintain the engagement between the mating features of the shell member and the corresponding mating features of the base.

In accordance with another aspect, there is provided a rheological probe having a base, an inner member fixed relative to the base, and a shell member covering the inner member. The shell member can have a pushing member engaged with the inner member at the distal end. The pushing member can be abutingly engaged with a sliding face of the inner member in a manner to communicate normal forces thereto to deform a deformable portion of the inner member when the rheological probe is moved in a rheological substance, while being allowed to slide longitudinally and/or circumferentially thereagainst, which can avoid transmittal of forces other than a normal force.

In accordance with one aspect, there is provided a rheological probe comprising: a base; an inner member fixedly connected to the base and extending longitudinally away from the base, the inner member having in succession a base portion proximate to the base, and a tip away from the base, and a deformable portion located between the base portion and the tip; a shell member covering the inner member, the shell member having a proximal portion being pivotally connected to the base for pivoting about a pivot axis when subjected to a resistance pressure imparted by a relative movement of the probe in a rheological substance, and a distal portion, the distal portion being connected to the tip to transfer a force resulting from the resistance pressure and thereby elastically deform the deformable portion, the shell member having mating features being pivotally engaged with corresponding features of the base, the mating features being located on transversally opposite sides of the proximal portion; and a deformation sensor mounted to the deformable portion for providing a value indicative of the resistance pressure.

In accordance with another aspect, there is provided a rheological probe comprising: a base; an inner member fixedly connected to the base and extending longitudinally away from the base, the inner member having in succession a base portion proximate to the base, and a tip away from the base, and a deformable portion located between the base portion and the tip; a shell member covering the inner member, the shell member having a proximal portion being pivotally connected to the base for pivoting about a pivot axis when subjected to a resistance pressure imparted by a relative movement of the probe in a rheological substance, and a distal portion, the distal portion being connected to the tip to transfer a force resulting from the resistance pressure and thereby elastically deform the deformable portion, the shell member having a pushing member extending longitudinally inwardly from the distal portion of the shell member, the pushing member being abutingly engaged with a sliding face of the inner member in the orientation of the resistive force; and a deformation sensor mounted to the deformable portion for providing a value indicative of the resistance pressure.

Many further features and combinations thereof concerning the present improvements will appear to those skilled in the art following a reading of the instant disclosure.

DESCRIPTION OF THE FIGURES

In the figures.

DETAILED DESCRIPTION

Figure 1:
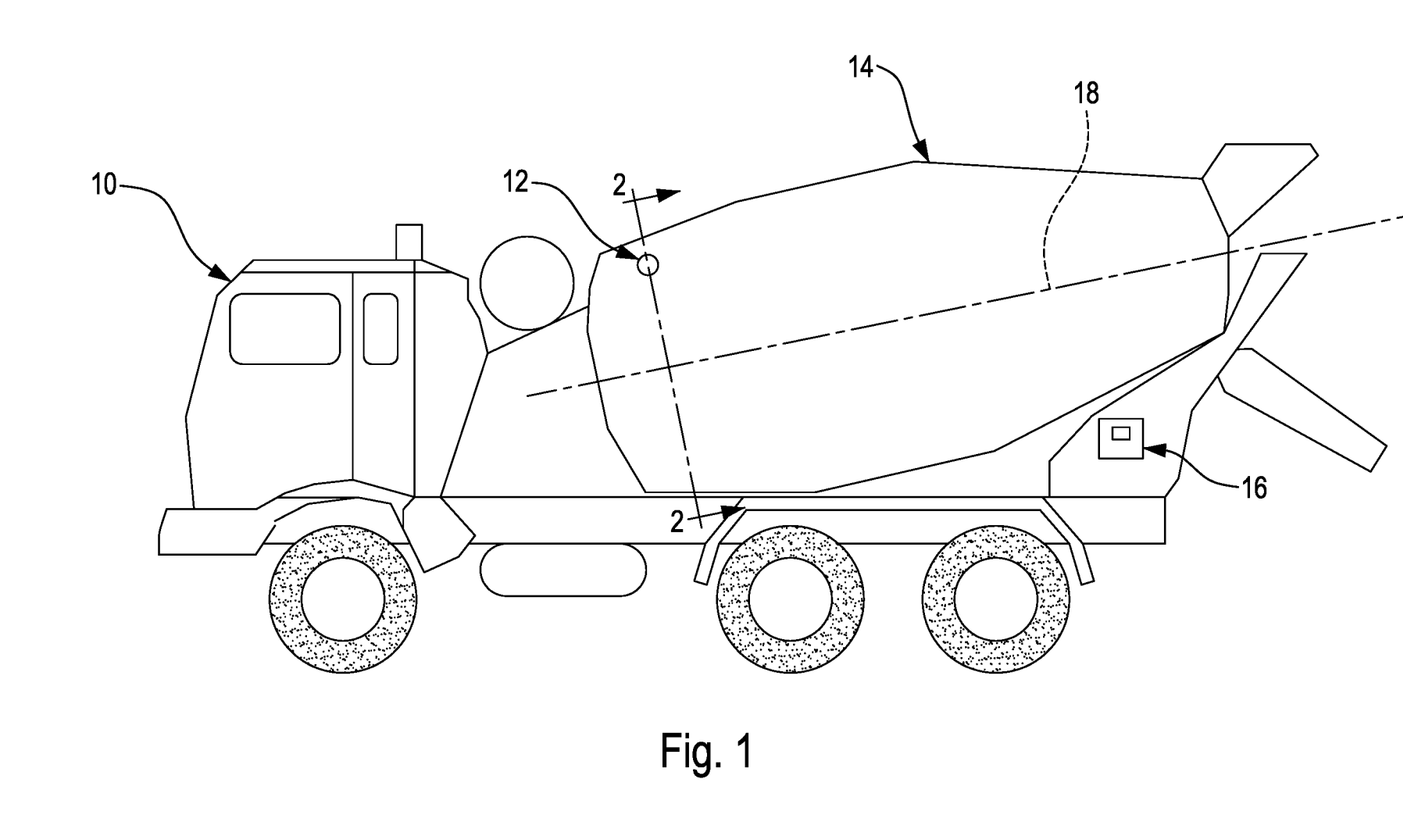
FIG. 1 is a side elevation view of an example of a mixer truck, in accordance with an embodiment.
Figure 2:
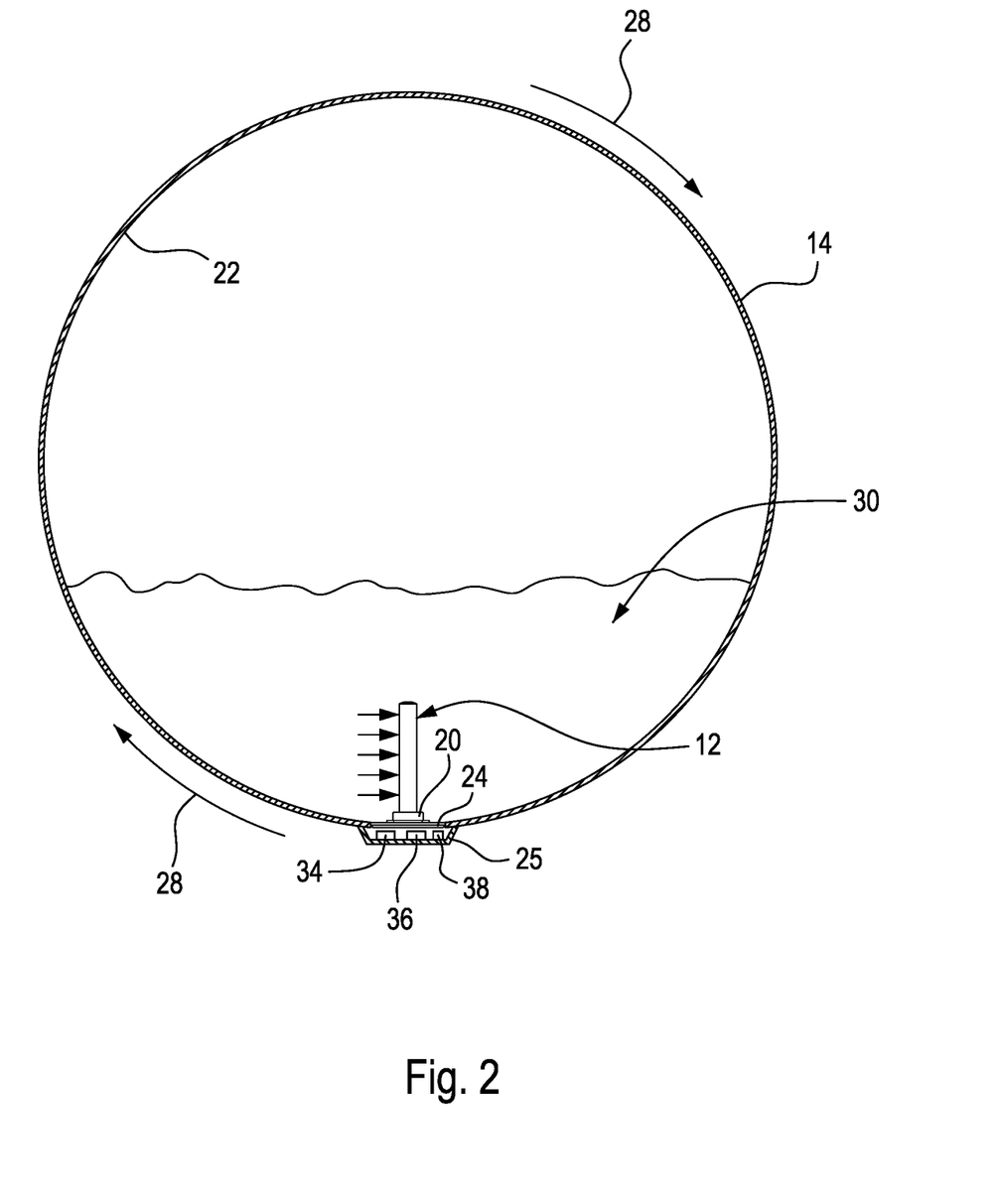
FIG. 2 is a cross sectional view of an example of a probe mounted to a drum of the mixer truck of FIG. 1, in accordance with an embodiment.

Reference is made to FIGS. 1 and 2, which are provided to give one example of a context in which a rheological probe can be used. In this example, the rheological probe is mounted within the rotary drum of a mixer truck and protrudes radially inside the drum to be displaced inside the ready-mix concrete by rotation of the drum and thereby receive a measurable resistance pressure from the ready-mix concrete.

FIG. 1 shows a side view of a mixer truck 10, with a probe 12 schematically shown in the drum 14 of the mixer truck 10. The probe 12 can be used to measure a normal force corresponding to the resistance of the probe 12 as it is moved inside the ready-mix concrete, which can be used to obtain indications of rheological properties of the concrete inside the drum 14. It can also have additional sensors, and can be used to further obtain indications of mixer speed and direction, fluid flow properties, fluid temperature for instance. The probe 12 can transmit data. In this embodiment, the probe 12 is configured to transmit data to a receiver 16 via a wireless connection and be self-powered in embodiments were it is desired to avoid the challenges of providing a wired or contact-type connection between the vehicle and the rotary drum. In a mixing truck, the rotation axis 18 of the drum 14 is inclined relative to the horizontal.

Following this example, reference will be made to concrete as being the substance to rheologically characterize; but it is understood that the probe 12 can be used with another container or recipient than a mixer truck drum 14, rotary or not, which may contain other substances exhibiting rheological properties such as fluids for the food processing industry, the paint industry, the oil industry, etc. Similar mixers are not necessarily provided on trucks, and other types of mixers can be used. For example, the mixer can be an industrial mixer, a stationary mixer, a blending system including high shear mixers, in-line mixers, or agitators.

Returning to the example of a mixer truck, FIG. 2 shows an example of the mounted probe 12. In this example, the probe 12 has a base 20, which is affixed to a wall 22 of the drum 14. In the case of a mixing truck, for instance, the probe 12 can be mounted to the wall 22 of the mixing truck. For instance, the probe 12 can be mounted by forming an aperture in the wall 22 by removing a portion thereof, soldering a receiving plate 24 to replace the removed portion of the wall, and securing the probe 12 to the receiving plate 24, for instance, but other techniques are possible as well. In one embodiment, the receiving plate 24 can have an aperture 55 (see FIG. 3) across which an internal cavity in the base 20 is accessible, which can be practical in operations such as maintenance. In one embodiment, a housing 25 is provided externally to the receiving plate 24. The housing 25 can house electronic components such as an electronic module 34, a power supply 36 and a transmitter 38 to transmit data from the probe 12 to the receiver 16. A wired connection (a wire or wires) can extend between the probe and the electronic components of the housing, across the aperture 55, for instance. Alternately, the probe 12 can be mounted to an inspection door of the drum 14, and electronic components such as batteries and a transmitter can be housed within a cavity provided within the base, for instance. The electronic module 34 can be powered with replaceable or rechargeable batteries for instance. In some embodiments, the electronic module 34 can use various algorithms to reduce its power requirements, and thus maintenance, such as turning off the transmitter 38 between transmissions. In some other embodiments, the batteries can be rechargeable and combined with one or more other power sources such as solar panels, or inductive loops to further reduce maintenance.

During use, the probe 12 rotates with the drum 14 in the rotating direction shown by arrows 28, or in the opposite direction, depending on whether the drum 14 is mixing or emptying the load of concrete 30. In both cases, the concrete 30 remains toward the bottom of the drum 14 due to the action of gravity and its limited viscosity. The probe 12 is thus immersed into the concrete 30 at each revolution and travels therein. The concrete 30 exerts a resistance pressure shown schematically with arrows opposing the movement of the probe 12. Amongst many alternative possibilities, the probe 12 can directly measure parameters such as the position of the probe, the force (or resistance pressure exerted by the substance on the probe), the temperature, etc. The probe 12 can subsequently use these parameters to determine the speed, and thence use speed and force values for instance to obtain an indication of properties of the fluid such as the viscosity, the yield, the cohesion, etc, to name some examples. The probe 12 can be made of any suitable material, but it will be understood that in the context of the relatively harsh environment of ready-mix concrete, stainless steel can be preferred for rigid components designed to be exposed to the ready-mix concrete.

In another embodiment, for example, the container can be fixed and a probe can be moved manually, be provided on rails or have other movement means over the container where the movement means can be used to displace the probe at speeds which can optionally be controlled.

Figure 3:
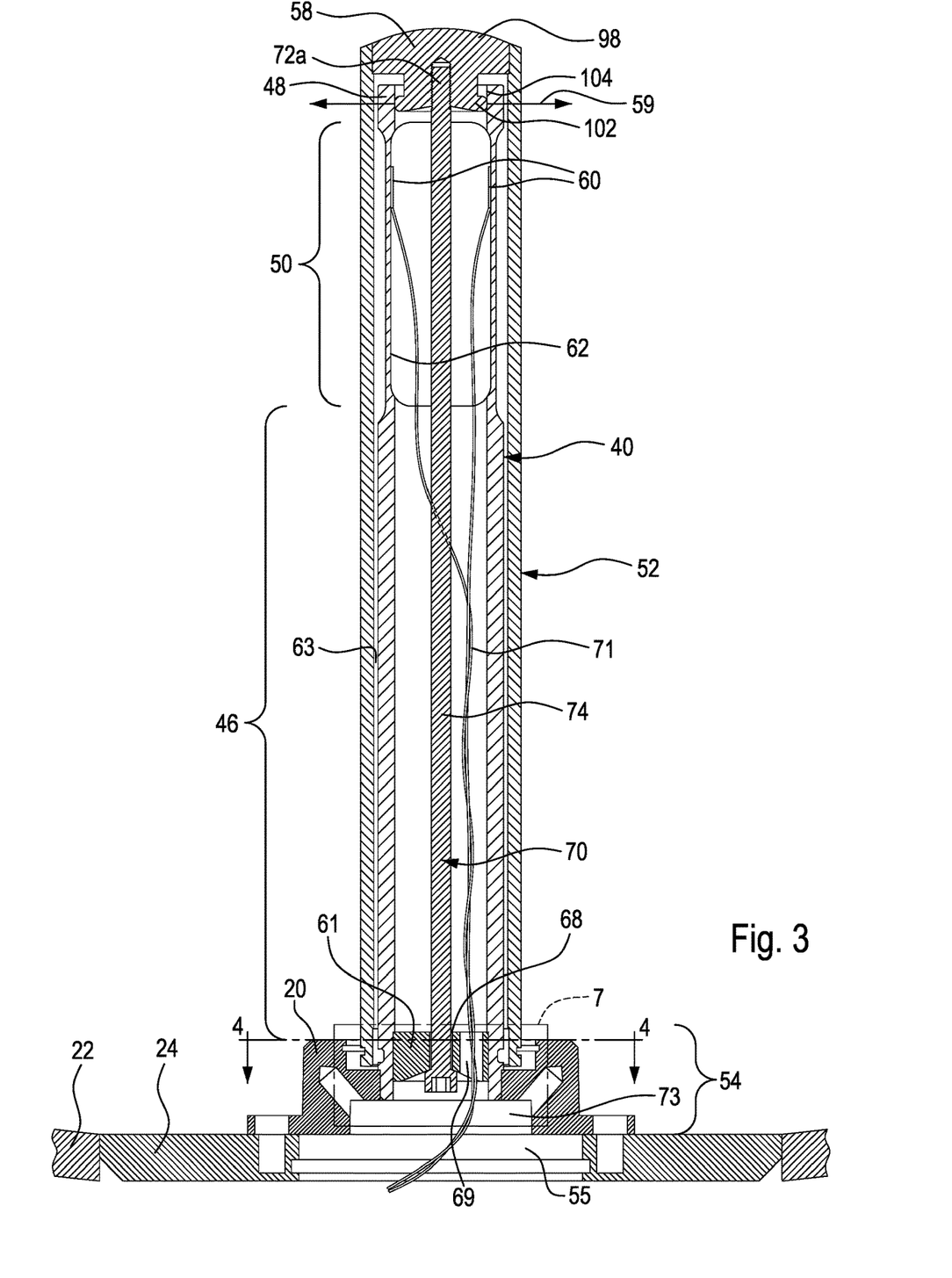
FIG. 3 is a cross sectional view of an example of the probe of FIG. 2, in accordance with an embodiment.

FIG. 3 shows a longitudinal cross-sectional view of an example of the probe 12, in accordance with an embodiment. The base 20 is secured to the plate 24 that can be soldered within an aperture defined in the wall 22 of the drum 14. In this embodiment, it is secured to the plate with fasteners (not shown), from the inside. Alternately, the base can be secured to the wall from the outside, and extend across an aperture in the wall, for instance.

Broadly described, the probe 12 has an inner member 40, which is secured to the base 20 and extends into the drum 14. The inner member 40 can be secured to the base 20 by fastening or soldering, for instance.

The inner member 40 extends longitudinally away from the base 20, thus defining a longitudinal orientation to the probe 12. The inner member 40 has in succession a base portion 46 proximate to the base 20, and a tip 48 away from the base 20, and a deformable portion 50 located between the base portion 46 and the tip 48.

Figure 5:
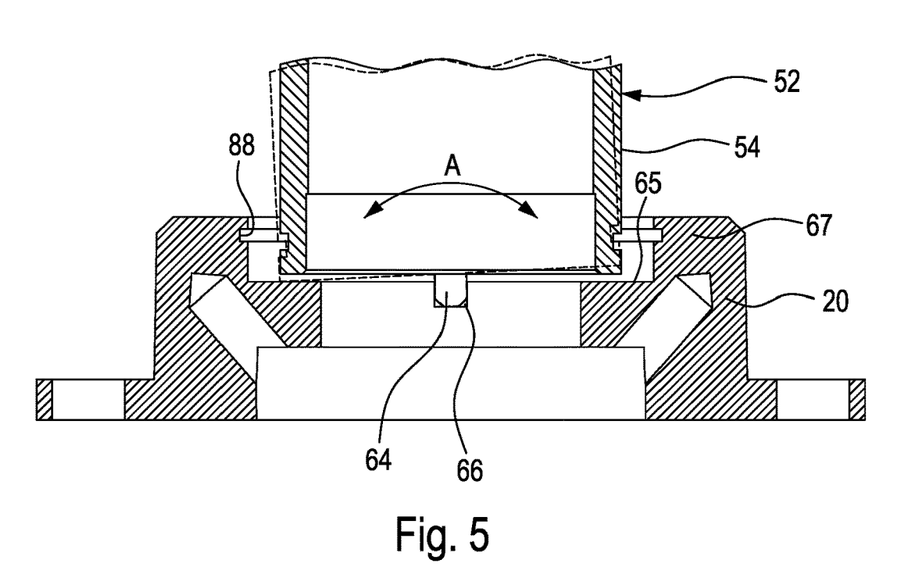
FIG. 5 is a cross-sectional view taken along line 5-5 of FIG. 4.

As depicted, the probe 12 has a shell member 52 having a hollow interior, which covers the inner member 40 and plays the role of receiving the resistance pressure from the rheological substance. The shell member 52 has a proximal portion 54 being pivotally engaged to the base 20 for pivoting about a pivot axis normal to the page bearing FIG. 3, when subjected to the resistance pressure imparted by a relative movement of the probe 12 in a rheological substance, for allowing a pivoting movement such as shown in FIG. 5. As shown, the shell member 52 has a distal portion 58 which is engaged to the tip 48 to transfer a force resulting from the resistance pressure received by the shell member 52 to the inner member 40, and thereby elastically deform the deformable portion 50. In this embodiment, as will be explained below with reference to FIG. 9, this engagement is an abutting engagement in the normal orientation 59 (horizontal on the page bearing FIG. 3), and the distal portion 58 is free to slide against the inner member 40 along the length of the probe and circumferentially around the axis of the probe. Indeed, as will be described in further detail below, the engagement between the distal portion 58 of the shell member 52 and the tip 48 of the inner member 40 can be fixed in three axes, two axes, or only in the axis of the normal force resulting from the resistance pressure such as is the case in this specific embodiment.

A deformation sensor 60 is mounted to the deformable portion 50 for providing a value indicative of the resistance pressure during use. In some embodiments, the deformation sensor 60 includes one or more strain gauges 62.

Figure 8:
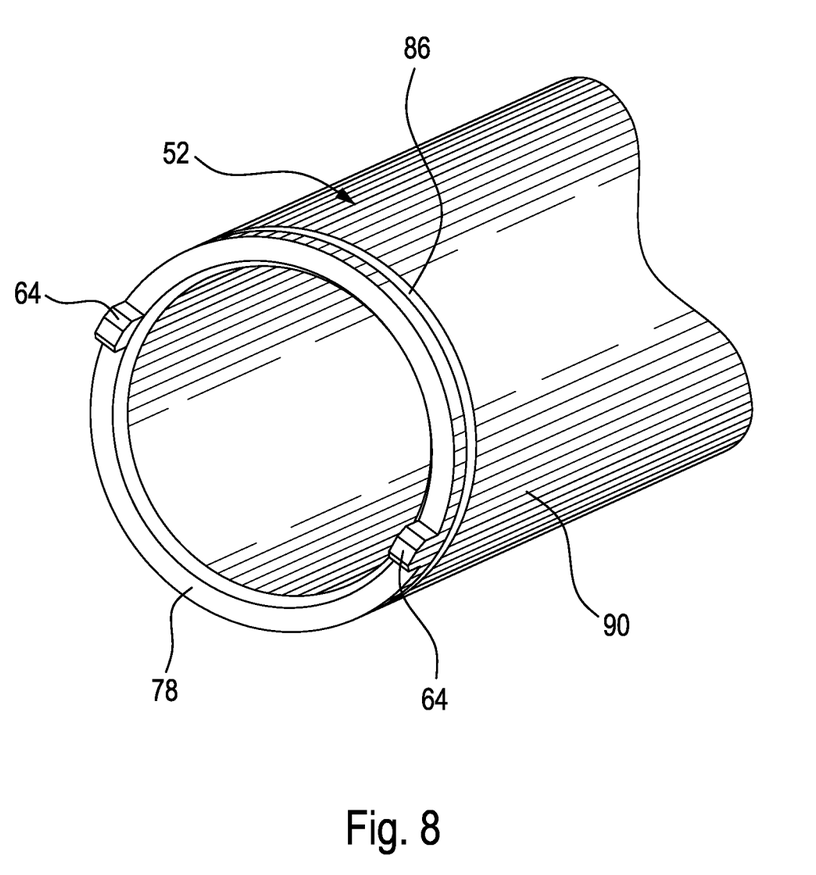
FIG. 8 is an oblique view of an example of a shell member of the probe of FIG. 2, in accordance with an embodiment.

As best seen in FIGS. 5 and 8. 5, the shell member 52 has mating features being pivotally engaged with corresponding features of the base 20 for the pivotal of the shell member 52 about the pivot axis 56. As depicted, the mating features allow the distal portion 58 of the shell member 52 to slightly move from left to right, as per bidirectional arrow A, when the probe 12 is in operation in the drum 14. In this specific embodiment, the mating features of the shell member 52 include two rockers 64 protruding from transversally opposite sides of the proximal portion 54 of the shell member 52. The corresponding mating features of the base 20 are recesses 66. As shown, the two rockers 64 are received in corresponding recesses 66 of the base 20.

Figure 4:
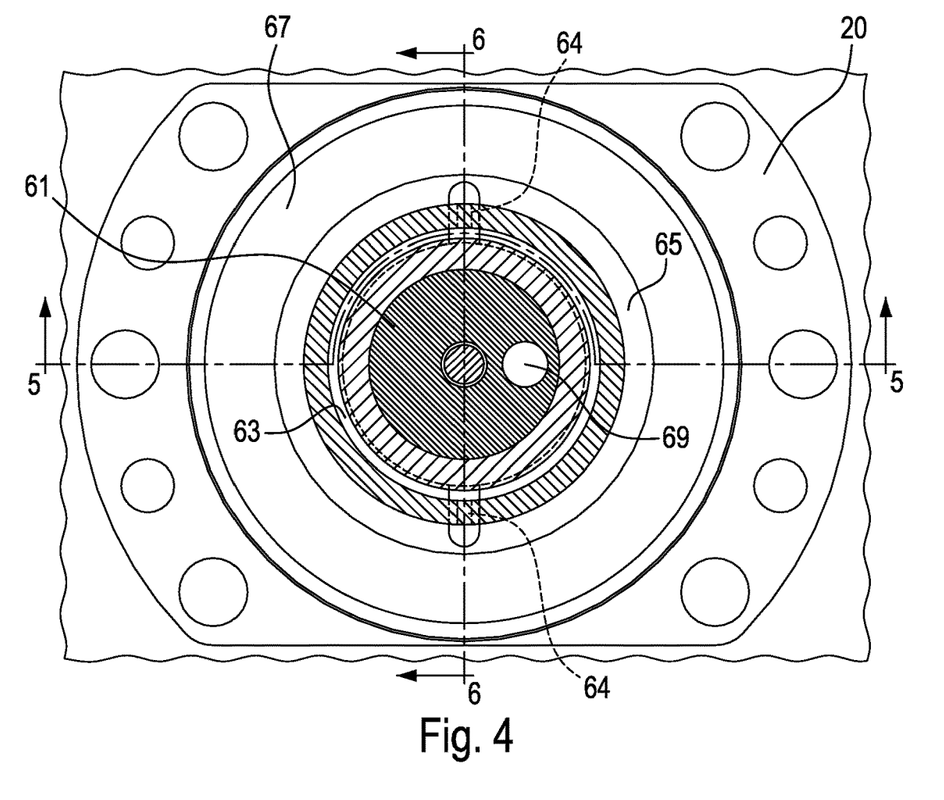
FIG. 4 is a sectional view taken along line 4-4 of FIG. 3.

As best shown in FIG. 4, the recesses 66 of the base 20 are positioned so as to receive the two rockers 64 of the proximal portion 54 of the shell member 52. As can be understood, the base portion 46 of the inner member 40 is located between the two rockers 64 of the shell member 52 and the corresponding recessed features 66 of the base 20.

As depicted, the two rockers 64 (male features) are provided at the proximal portion 54 of the shell member 52, and the recesses 66 (female features) are provided in the base 20. However, in alternate embodiments, the two rockers 64 (male features) can be provided in the base 20 whereas the recessed features 66 (female features) can protrude from the proximal portion 54 of the shell member 52.

In this specific embodiment, and referring back to FIG. 3, the inner member 40 has a longitudinal cavity 68 extending away from the base 20. As shown, the shell member 52 is provided with a securing member 70 received in the longitudinal cavity 68 of the inner member 40. As depicted, the securing member 70 has a first end 72a fixed relatively to the distal portion 58 of the shell member 52 and a second end 72b fixedly received in the base 20 in a manner that tension can be permanently present in the securing member 70 and maintain the rockers 64 firmly engaged with the recesses 66. More specifically, in this embodiment, the second end 72b is made integral to the base 20 because it is engaged with a receiving member 61 which itself is firmly received within the inner member 40, the inner member itself being firmly secured to the base 20. Even more specifically, the second end 72b has a head engaged with a receiving face of the receiving member, and a stem of the securing member 70 extends across an aperture formed in the receiving member 61 and extends to the first end 72a, at which point it is threadingly engaged with a cap member of the shell member. In this embodiment, the receiving member 61 further comprises a longitudinally extending wire aperture which is offset from the axis of the inner member 40. The wire aperture 69 can be used to pass a wire or wires 71 across the receiving member 61, between the deformation sensors 60 and the hollow cavity 73 within the base 20. Such wires 71 can then be passed across the plate aperture 55 to be connected to the electronic components of the probe in the housing 25, for instance.

In this embodiment, the securing member 70 is provided in the form of a rod 74. In an alternate embodiment, the securing member 70 can be provided in the form of a cable tensioned between the distal portion 58 of the shell member 52 and the base 20, for instance.

As can be understood, the securing member 70 can be used to secure the shell member 52 relatively to the base 20 while still allowing the shell member 52 to pivot about the pivot axis 56. To this end, the securing member 70 is preferably selected in a manner to be adapted to accumulate a functional level of tension stress, while being pivotable or elastically flexible in the transversal direction to the extent of allowing satisfactory pivotal movement of the shell member 52.

In this embodiment, both the shell member 52 and the base portion 46 of the inner member 40 are generally cylindrical in cross-sectional shape. The base portion 46 of the inner member 40 is firmer (thicker in this case) than the deformation portion 50. An annular gap having a precisely controlled dimension is provided between the inner diameter of the shell member 52 and the outer diameter of the base portion 46 in a manner that when the amplitude of the force exerted by the concrete against the shell member 52 exceeds a given threshold, the deformation portion 50 yields elastically to the extent that the inner diameter of the shell member 52 comes into abutment against the outer diameter of the base portion 46 in the area where the base portion 46 meets the deformation portion 50, preventing further deformation of the deformation portion. This can avoid the deformation of the deformation portion reaching a plastic deformation stage when excessive forces occur (e.g. during shocks or when operating in unmixed or otherwise unhomogeneous ready-mix concrete).

Figure 6:
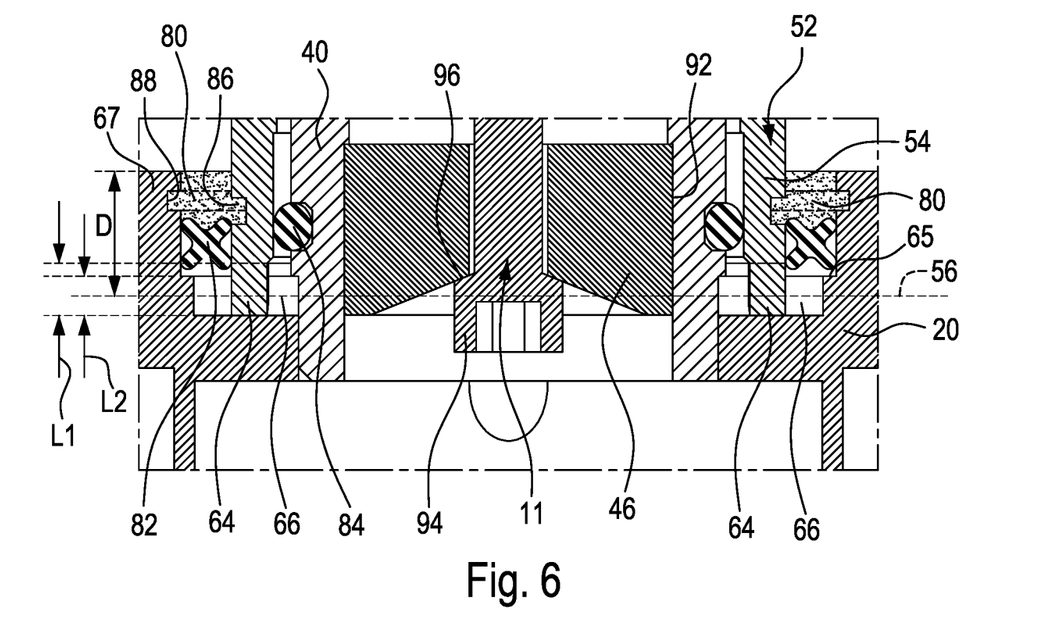
FIG. 6 is a cross-sectional view taken along line 6-6 of FIG. 4.
Figure 7:
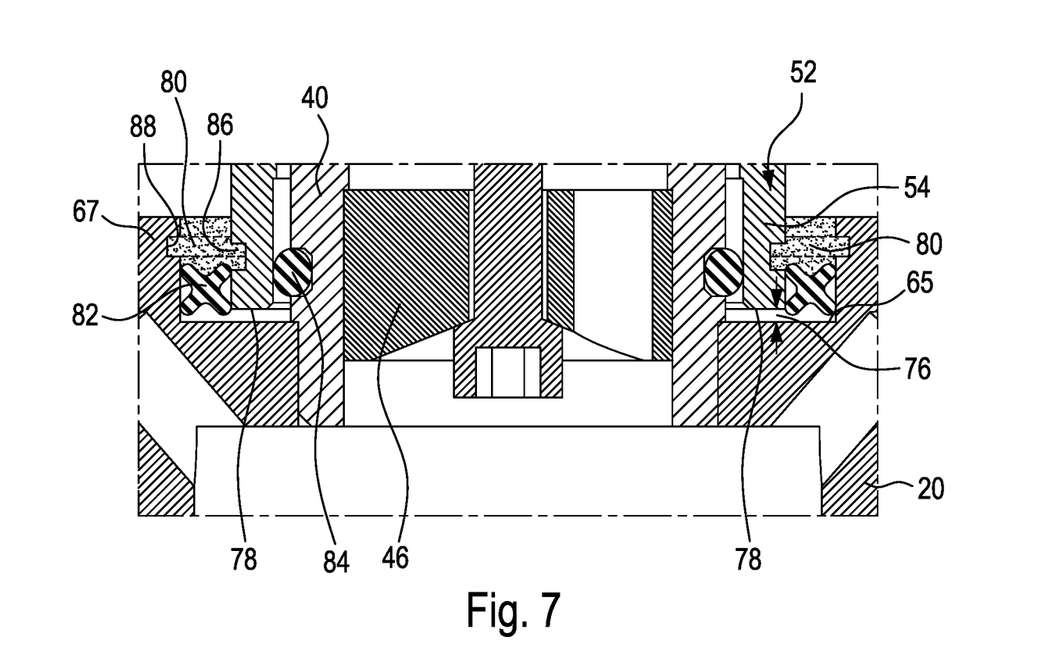
FIG. 7 is an enlarged view of area 7-7 of FIG. 3.

Reference is now made to FIGS. 6 and 7. More specifically, FIG. 6 shows the two rockers 64 of the proximal portion 54 of the shell member 52 being pivotally engaged with the two recessed features 66 of the base 20 for pivotal movement about the pivot axis 56. As best seen in FIG. 4D, to allow the shell member 52 to pivot to a given extent, a spacing 76 is provided between edge 78 of the proximal portion 54 of the shell member 52 and the base 20.

To provide the spacing 76, in this embodiment, the rockers 64 are designed to extend longitudinally away from the edge 78 for a first length L1 whereas the recesses 66 are designed to penetrate into a face 65 of the base 20 for a second length L2, wherein the second length L2 is smaller than the first length L1.

The base 20 can be provided with a neck 67 which protrudes from the face 65 and surrounds the shell member 52 along a given distance D. The spacing between the neck 67 and the shell member 52 can be filled with a sealing material 80. The sealing material 80 can be used to prevent the rheological substance to enter between the proximal portion 54 of the shell member 52 and the inner member 40 via the spacing 76. A sealing material being both resistant to ready-mix concrete can be selected and sufficiently flexible to limit any hindrance on the pivoting movement of the shell member 52 can be selected.

It will be noted that in this embodiment, the neck 67 has an upper face which extends transversally (in the direction of relative movement between the probe and the ready mix concrete, normal to the longitudinal orientation of the length of the probe), and the sealing material 80 also has an upper face which extends transversally, forming a continuity with the upper face of the neck. This configuration was found to limit the exposure of the sealing material 80 with the friction against ready-mix concrete, and thus favor wear resistance.

The seal 80 may be provided in the form of a sealant applied using a sealing gun which solidified after application thereof. However, to prevent the sealant pushed by the sealing gun to obstruct the spacing 76, a first sealing ring 82 can be used. In this embodiment, the first sealing ring 82 is provided around the edge 78 of the proximal portion 54 of the shell member 52 and is abutted on the base 20. In this embodiment, this first sealing ring 82 is an X-ring, which was found suitable in this specific configuration. As depicted, the first sealing ring 82 is sized and shaped to prevent the sealant from entering in the spacing 76.

Still in this embodiment, a second sealing ring 84 is provided between the base portion 46 of the inner member 40 and the proximal portion 54 of the shell member 52. In this embodiment, the second sealing ring 84, or internal sealing ring, is an O-ring.

In some embodiments, the proximal portion 54 of the shell member 52 is provided with a first annular recess 86 around the proximal portion 54. Similarly, the base 20, and more specifically the inside surface of the neck thereof, is provided with a second annular recess 88 around the base 20 and facing inwardly towards the proximal portion 54 of the shell member 52. In this example, the first and second annular recesses 86 and 88 can provide anchor points for the sealing material of the seal 80, which can help maintaining the proximal portion 54 of the shell member 52 into position. In an alternate embodiment, only one such anchor can be provided for instance, or none at all.

FIG. 8 shows an oblique view of the proximal portion 54 of the shell member 52, in accordance with an embodiment. As depicted, the shell member 52 has a cylindrical wall 90 which defines the annular edge 78 from which protrudes the two rockers 64. As can be seen, the two rockers 64 are provided at diametrically opposite portions of the annular edge 78. Also, the first annular recess 86 is shown.

Figure 9:
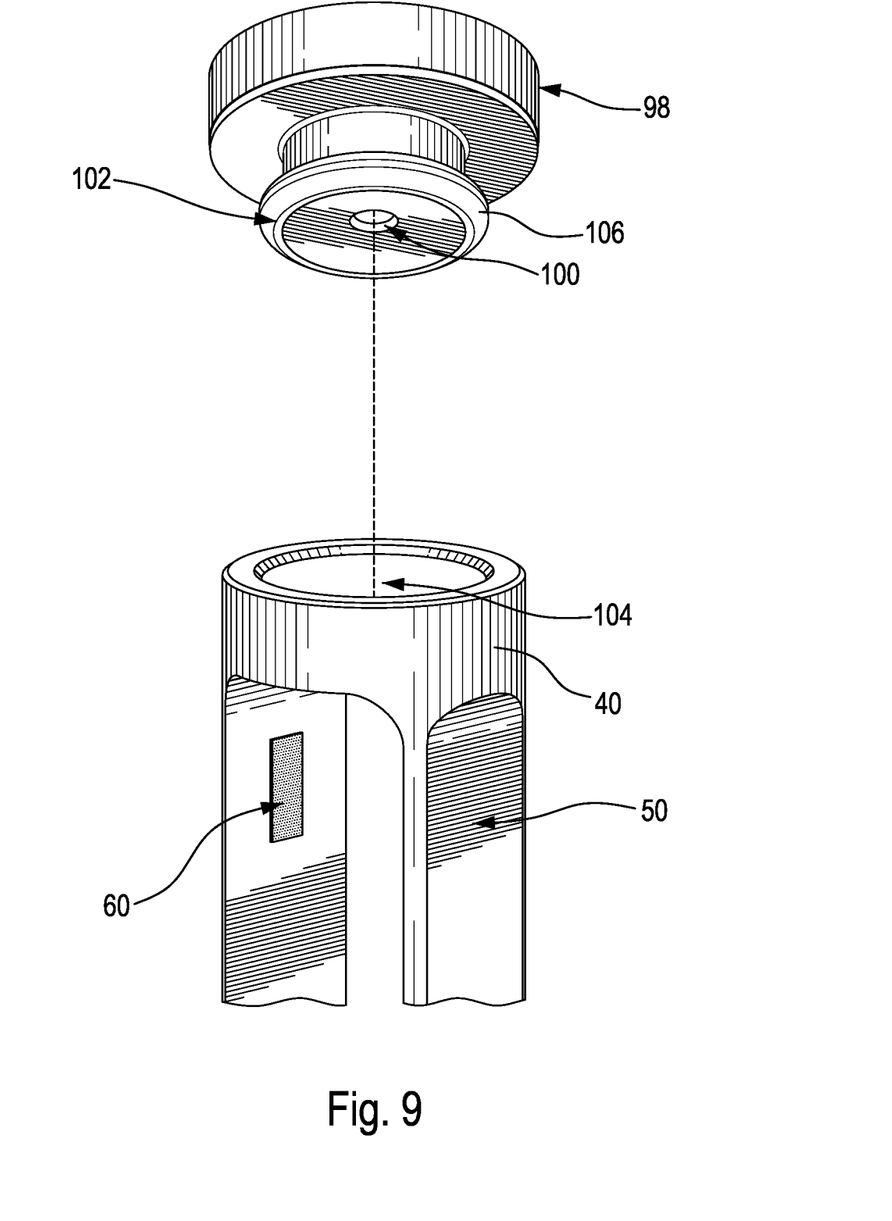
FIG. 9 is an exploded view showing a cap of a shell member and an inner member of the probe of FIG. 2, in accordance with an embodiment.

In this example, the base portion 46 of the inner member 40 is welded to the base 20. Alternately, the base portion 46 of the inner member 40 may be secured to the base 20 via a threaded engagement. In this example, the securing member 70 is a bolt having a bolt head 94 snugly received in a bolt head recess 96 of the base portion 46 of the inner member 40.

The shell member 52 includes a cap 98 to which is fixed the first end 72a of the securing member 70. In this example, the first end 72a of the securing member 70 has externally facing threads, and the cap 98 of the shell member 52 has a bore 100 having inwardly facing threads so that the first end 72a is screwed to the cap 98 via rotation of the bolt head 94. In this embodiment, the cap 98 is welded internally to the distal end of a hollow cylindrical tube of the shell member 52. The position of the weld is such that its exposure to the ready-mix concrete is limited, which can contribute to wear resistance.

As presented above, the shell member 52 is mounted to the tip of the inner member 40 in a manner to transfer the normal force stemming from the resistance pressure of the ready-mix concrete against the shell member 52, as the shell member 52 is moved in the ready-mix concrete. This can be achieved by forming a rigid connection (e.g. welding) between the tip of the shell member 52 to the tip of the inner member 40, for instance. In the embodiment shown in the figures, however, it was preferred to the achieve the mounting of the shell member 52 to the tip of the inner member 40 via a longitudinally and circumferentially sliding engagement. Indeed, as can be seen, the shell member 52 has a pushing member 102 extending longitudinally inwardly from the distal portion of the shell member 52, e.g., the cap 98. The pushing member 102 is slidingly received within a cylindrical wall having an internal sliding face 104. The pushing member 102 is operable to abut against the cylindrical wall and deform the deformation portion of the inner member 40 when moved in the orientation of the resistive force, i.e. the x-axis in this example. However, the sliding engagement prevents the transfer of longitudinally oriented forces (e.g. z-axis) which could otherwise be transferred and perhaps distort the deformation linearity of the deformation portion proportionally to the amplitude of the x-axis force. Accordingly, the sliding engagement may improve the precision of the reading of the deformation sensors 60. in this embodiment, the sliding face 104 of the inner member 40 extends longitudinally, i.e. along the z-axis in this example so that the pushing member 102 is slidable along the sliding face 104 in the longitudinal orientation. This configuration can allow to reduce the deformation of the deformable portion 50 of the inner member 40 when a force is applied on the shell member 52 along either direction of the longitudinal orientation, i.e. the z-axis.

FIG. 9 shows an exploded view of an example of the cap 98 of the shell member 52 and the inner member 40, in accordance with an embodiment. As shown in this example, the sliding face 104 of the inner member 40 extends circumferentially and faces inwardly. As can be understood, the pushing member 102 is provided in the form of an annular projection 106 which projects circumferentially around the pushing member 102 and faces outwardly. The inner member 40 has a corresponding female portion shaped as a hollow cylinder. When mounted to one another, as shown in FIG. 3, the annular projection 106 is rotatably slidable around the longitudinal axis of the inner member 40, and is longitudinally slidable within the hollow cylinder portion, but can firmly transfer forces in the normal orientation 59. This configuration can allow to reduce the deformation of the deformable portion 50 of the inner member 40 when a torque about the z-axis is applied to the shell member 52.

As can be understood, the examples described above and illustrated are intended to be exemplary only. For instance, instead of using a tensioning member to hold the shell member to the base, screws can be used to hold the rockers, or pivot pins can be used across the rockers, for instance. The scope is indicated by the appended claims.

What is claimed is:

1. A rheological probe comprising:
   a base;
   an inner member fixedly connected to the base and extending longitudinally away from the base, the inner member having in succession a base portion proximate to the base, and a tip away from the base, and a deformable portion located between the base portion and the tip;

a shell member covering the inner member, the shell member having a proximal portion being pivotally connected to the base for pivoting about a pivot axis when subjected to a resistance pressure imparted by a relative movement of the probe in a rheological substance during use, and a distal portion, the distal portion being engaged with the tip to transfer a force resulting from the resistance pressure and thereby deform the deformable portion, the shell member having mating features being pivotally engaged with corresponding mating features of the base, on transversally opposite sides of the proximal portion, the mating features of one of the shell member and the base including rockers protruding from said transversally opposite sides and longitudinally away from said one of the shell member and the base, and the mating features of the other one of the shell member and the base including recesses adapted to receive the rockers; and a deformation sensor mounted to the deformable portion for providing a value indicative of the resistance pressure.

2. The rheological probe of claim 1 wherein the inner member has a longitudinal cavity extending away from the base, the shell member having a securing member received in the longitudinal cavity of the inner member and securing the shell member to the base, the securing member having a first end fixed relatively to the distal portion of the shell member and a second end fixed relatively to the base, the securing member maintaining the rockers engaged with the recesses.

3. The rheological probe of claim 2 wherein the securing member is a rod having a head at the second end and a threaded tip at the second end, the threaded tip being threadingly engaged with the distal portion of the shell member.

4. The rheological probe of claim 3 wherein the base has an inner cavity, and the head is located in the inner cavity.

5. The rheological probe of claim 1 wherein the base has a neck protruding around a portion of the shell member, and wherein a spacing between the neck and the shell member is filled with a sealing material.

6. The rheological probe of claim 5 wherein a ring seal is provided around a lower edge of the shell member, the ring seal delimiting the area filled with said sealing material.

7. The rheological probe of claim 5 wherein the neck has an upper surface extending transversally, the sealing material has an upper surface extending transversally and forming a continuity with the upper surface of the neck.

8. The rheological probe of claim 1 wherein the base portion of the inner member is located between the mating features of the shell member and the corresponding mating features of the inner member.

9. A rheological probe comprising:

a base;

an inner member fixedly connected to the base and extending longitudinally away from the base, the inner member having in succession a base portion proximate to the base, and a tip away from the base, and a deformable portion located between the base portion and the tip;

a shell member covering the inner member, the shell member having a proximal portion being pivotally connected to the base for pivoting about a pivot axis when subjected to a resistance pressure imparted by a relative movement of the probe in a rheological substance, and a distal portion, the distal portion being engaged with the tip to transfer a force resulting from the resistance pressure and thereby deform the deformable portion, the shell member having a pushing member extending longitudinally inwardly from the distal portion of the shell member, the pushing member being abuttingly engaged with a sliding face of the inner member in the orientation of the resistive force; and a deformation sensor mounted to the deformable portion for providing a value indicative of the resistance pressure.

10. The rheological probe of claim 9 wherein the sliding face of the inner member extends longitudinally, the pushing member being slidable along the sliding face in the longitudinal orientation.

11. The rheological probe of claim 9 wherein the sliding face of the inner member extends circumferentially, the pushing member being rotatably slidable against the sliding face.

12. The rheological probe of claim 9 wherein the sliding face extends longitudinally and circumferentially, and forms a cylindrical wall, the pushing member having an annular projection projecting transversally and outwardly towards the sliding face, concentrically to the cylindrical wall.

13. The rheological probe of claim 9 wherein the shell member has mating features being pivotally engaged with corresponding mating features of the base, on transversally opposite sides of the proximal portion.

14. The rheological probe of claim 13 wherein the mating features of one of the shell member and the base includes rockers protruding from said transversally opposite sides, and the mating features of the other one of the shell member and the base includes recesses adapted to receive the rockers.

15. The rheological probe of claim 14 wherein the inner member has a longitudinal cavity extending away from the base, the shell member having a securing member received in the longitudinal cavity of the inner member and securing the shell member to the base, the securing member having a first end fixed relatively to the distal portion of the shell member and a second end fixed relatively to the base, the securing member maintaining the rockers engaged with the recesses.

16. The rheological probe of claim 15 wherein the securing member is a rod having a head at the second end and a threaded tip at the second end, the threaded tip being threadingly engaged with the distal portion of the shell member.

17. The rheological probe of claim 16 wherein the base has an inner cavity, and the head is located in the inner cavity.

18. The rheological probe of claim 9 wherein the base has a neck protruding around a portion of the shell member, and wherein a spacing between the neck and the shell member is filled with a sealing material.

19. The rheological probe of claim 18 wherein a ring seal is provided around a lower edge of the shell member, the ring seal delimiting the area filled with said sealing material.

20. The rheological probe of claim 18 wherein the neck has an upper surface extending transversally, the sealing material has an upper surface extending transversally and forming a continuity with the upper surface of the neck.

* * * * *